United States Patent
Weikel, Jr.

(10) Patent No.: US 7,793,091 B2
(45) Date of Patent: Sep. 7, 2010

(54) METHOD, COMPUTER-READABLE MEDIA, DEVICES AND SYSTEMS FOR LOADING A SELECTED OPERATING SYSTEM OF INTEREST

(75) Inventor: Robert J. Weikel, Jr., Falls Church, VA (US)

(73) Assignee: Sytex, Inc., Doylestown, PA (US)

( * ) Notice: Subject to any disclaimer, the term of this patent is extended or adjusted under 35 U.S.C. 154(b) by 741 days.

(21) Appl. No.: 11/162,049

(22) Filed: Aug. 26, 2005

(65) Prior Publication Data

US 2007/0050611 A1    Mar. 1, 2007

(51) Int. Cl.
  *G06F 1/24*    (2006.01)
  *G06F 9/00*    (2006.01)
  *G06F 13/24*   (2006.01)
  *G06F 13/32*   (2006.01)
  *G06F 9/44*    (2006.01)
  *G06F 9/445*   (2006.01)

(52) U.S. Cl. .............................. 713/100; 713/1; 713/2; 710/261; 710/269; 717/169; 717/175

(58) Field of Classification Search ................ 713/100, 713/1, 2; 710/261, 269; 717/169, 175
  See application file for complete search history.

(56) References Cited

U.S. PATENT DOCUMENTS

| | | | |
|---|---|---|---|
| 5,887,164 A * | 3/1999 | Gupta ........................... | 713/2 |
| 2001/0018721 A1* | 8/2001 | McKenna et al. ........... | 710/126 |
| 2005/0050313 A1* | 3/2005 | Chen et al. .................... | 713/2 |
| 2006/0064571 A1* | 3/2006 | Tseng ............................ | 713/1 |
| 2006/0101259 A1* | 5/2006 | Chen ............................. | 713/2 |

* cited by examiner

*Primary Examiner*—Stefan Stoynov
(74) *Attorney, Agent, or Firm*—Buchanan Ingersoll & Rooney PC (57) ABSTRACT

Representative of the various embodiments is a method for implementation during a computer's boot sequence to load a selected operating system (OS) of interest. For purposes of such a method the computer includes a system BIOS, a video BIOS, and a customary boot loader accessible from a predetermined address pointed to by a system interrupt pointer. During system BIOS execution, the system interrupt pointer is redirected to an alternate address from which a replacement boot loader is accessible. The selected OS of interest is then loaded via the replacement boot loader rather than the customary boot loader.

26 Claims, 9 Drawing Sheets

METHOD, COMPUTER-READABLE MEDIA, DEVICES AND SYSTEMS FOR LOADING A SELECTED OPERATING SYSTEM OF INTEREST

BACKGROUND

Figure 1:
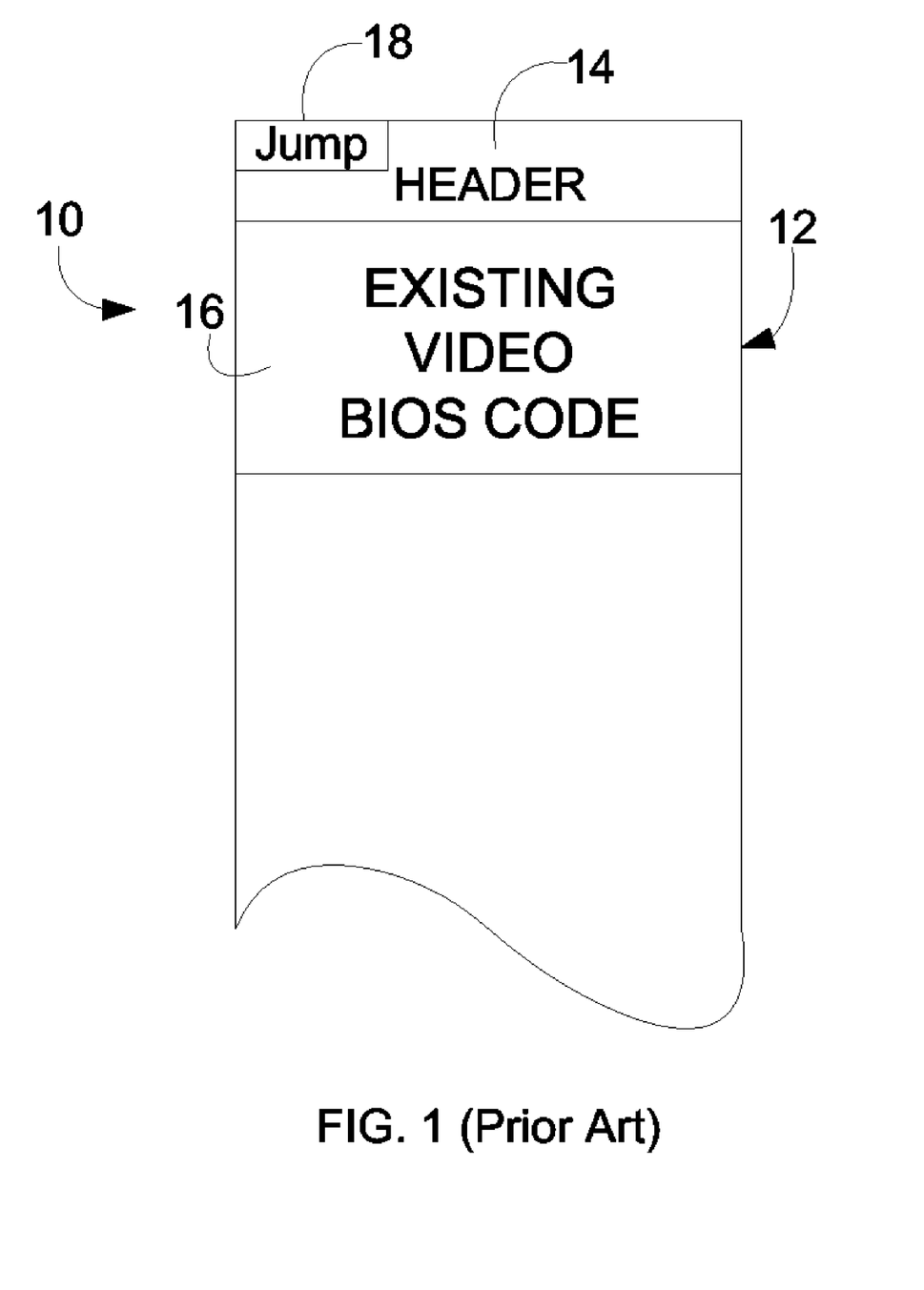
FIG. 1 diagrammatically depicts, in block form, a video card and its associated firmware according to the prior art.

To a large extent computers today employ a somewhat antiquated boot sequence, or variations of it, for loading their operating systems. As well known, the system BIOS is an essential set of routines in a computer for providing an interface between the operating system (OS) and the hardware, and is responsible for initializing the computer once it is powered on. System BIOS typically is stored on a single firmware chip residing on the computer's motherboard, and BIOSes may require periodic updating to keep pace with new peripheral technologies. If the BIOS is stored in a read only memory (ROM BIOS) updating it necessitates replacing the firmware itself. In current systems, however, BIOSes are stored on flash memory chips (e.g. EPROMs and EEPROMs) to allow them to be upgraded via software. Peripheral devices may also have their own BIOS. One such peripheral device, the video card (or video adapter), is guaranteed to have such firmware code stored on ROM or a flash chip. Thus, for example, FIG. 1 diagrammatically represents a video card 10 having video firmware 12 provided with a header 14 and firmware code—in this case the video BIOS code 16. When the firmware 12 is accessed, a jump instruction 18 directs control to the beginning of the video BIOS code 16 for execution, all as known in the art.

Figure 2:
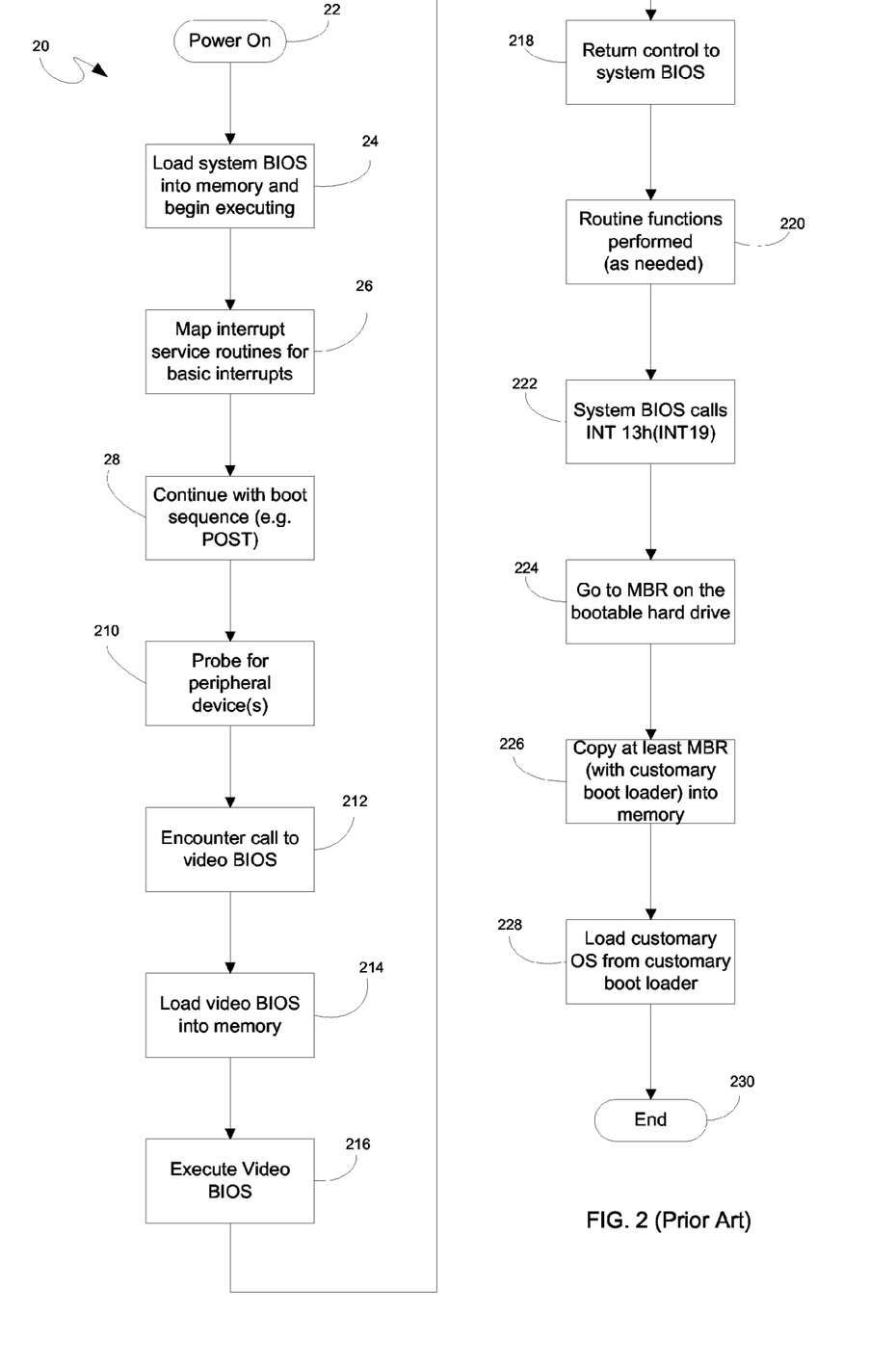
FIG. 2 represents a flow diagram for a conventional booting sequence according to the prior art.

A typical boot sequence 20 is summarized in FIG. 2. Actual boot sequences may vary by hardware manufactures, peripherals associated with the computer, peripheral BIOSes, etc. Thus, FIG. 2 generalizes the boot sequence for explanatory purposes. When power is supplied to the computer 22 pre-programmed instructions direct the processor to location FFFF0h at the end of the system memory, which contains a "jump" instruction informing the processor of the actual location of the system BIOS boot program. From there the system BIOS is loaded 24 from ROM into system memory for execution.

During execution, the system maps interrupts service routines for basic interrupts 26. Also during execution, system BIOS performs the power-on self test (POST) 28 and probes 210 for peripheral devices on its internal bus to map any additional interrupts and memory to these components. By convention, to enable an interface for the user, the system BIOS looks 212 to the first video card listed on its device mapping, and particularly the video BIOS, in order to initiate a console for the user. The video BIOS is loaded into memory 214 as a shadow copy at location C000h; or it can be mapped to allow for direct access. Control is then passed to the video BIOS 216 which is executed to initialize the video card. Modern systems at this point display information on the monitor about the video card. Control is then returned to the system BIOS 218 to ascertain if there are any additional peripheral BIOSes to execute. Thereafter, system BIOS proceeds to perform other routine functions 220 as needed, for example, memory tests, system inventory, configuration of plug-n-play devices, etc.

System BIOS then begins to search for a bootable drive (hard disk drive, floppy disk drive, CD-ROM drive, etc.), the ordering of which can be determined by a boot sequence setting. Typically the bootable drive is one of the hard drives of the computer system. The primary interface the BIOS has for accessing a hard disk is the software interrupt known as interrupt (INT) 13h. INT 13h has been the standard for many years but is being replaced with a newer interface called INT 13h extensions to accommodate larger hard disk memories while remaining compatible with older systems. Upon being called 222 INT 13h directs system BIOS to the master boot record (MBR) 224 on the bootable hard disk so that the OS can be loaded. The MBR is sometimes also referred to as the master boot sector or the boot sector, and is always located at cylinder 0, head 0, sector 1 (the first sector of the bootable disk).

A typically MBR has various parts. One part stores all of (or at least part of) a boot loader (or boot code)—a small program that loads the OS into the computer's memory when the system is booted and starts the OS. A typical boot loader, for example, may be 446 bytes long and stored within address range 000000-0001 bd. The MBR also contains a master partitions table that is 64 bytes long at address range 0001 be-0001 fd for describing the partitions contained on the hard disk, and a boot code signature of 55*aa* which is typically 2 bytes and stored at 0001 fe-0001 ff. This is essentially a flag to let the system know if there is actual a bootloader associated with the MBR.

Once system BIOS reads the MBR and copies it into memory 226, typically at location 0000:7C00, it jumps to this location to execute the boot loader. Depending on the order of installation an OS specific boot loader can add entries to the existing bootloader. For example, NTLDR is the boot loader for Windows including its later versions 2000/XP/Server2003. NTLDR can also load a non NT-based operating system given the appropriate boot sector in a file. NTLDR requires, at a minimum, the following two files to be on the active partition—NTLDR, which contains the main boot loader itself, and boot.ini, which contains configuration options for a boot menu. To load an NT-based OS, ntdetect.com must also be present. The equivalent of it in Linux is LILO/bootsect.s. In any event, once the boot loader is executed, it in turn loads the OS 228 from the hard drive into RAM. Boot sequence 20 then ends at 230.

Some practiced in the art refer to the entire sequence discussed above as the boot sequence while others confine that term only to the actual part which loads the OS, while referring to the preceding steps generically as POST. For purpose of this disclosure, the former characterization is adopted for distinction only and not for limitation. Those practiced in art will be aware that specifications are available for both BIOSes and boot loaders. For example, BIOS boot specification version 1.01 (May 9, 1995) is a emerging standard co-developed by Phoenix, Compaq, Intel and Microsoft. Also, for users of free operating systems such as Linux, Free BSD, Net BSD, MACH and VSTA, "The Multiboot Specification" is available. Each of these are hereby incorporated by reference as background information.

Since, by convention, system BIOSes read the MBR to locate code for loading the OS, this legacy predictability renders computers susceptible to exploitation by boot sector viruses. Such viruses, as with other types, can be malicious or simply annoying, but are always of concern. In the past, boot viruses were commonly written to the boot sectors of floppy disks when these were in widespread use. For example, when one neglected to remove the floppy disk from the drive when powering down the computer, subsequent powering on would lead to the system BIOS reading the boot sector program. Under normal conditions this would load the conventional OS, but could instead be tailored to execute an infected program. Once infected, the boot virus replicated itself onto subsequent floppies used on the machine. Perhaps the most well known boot virus for infecting computers in such a manner was known as the "Michaelangelo" virus. Currently, a major class of viruses referred to as "boot sector infectors" target the vulnerable boot areas of the hard disk. Some infect the code in the MBR while others infect code in the volume boot sector(s). By infecting such areas, a virus is assured to be loaded into memory each time the machine is booted from the infected area.

It is maintained that inadequate measures have been implemented thus far date to insulate computers against these types of attacks. For various reasons preventive measures are desired. For instance, by ensuring that systems will never boot or run anything not specifically configured or intended (i.e. customary), one can be confident that operating systems like KNOPPIX and other live-on-CD or live-on-USB distributions are not bootable. As such, system stability is maintained. Moreover, even if the malicious loading of a boot virus into the MBR cannot be prevented through suitable security measures, deviation from this traditional boot sequence to an alternate boot path would render a virus dormant since it would not be loaded, in turn facilitating subsequent detection repair of the infected area(s). Thus, improved measures are desired to provide enhanced security in relation to the booting sequence.

The foregoing discussion of the related art and its related limitations is intended to be illustrative and not exclusive. Other limitations may become apparent to those practiced in the art upon a reading of the specification and a study of the drawings.

SUMMARY

The following embodiments and aspects thereof are described and illustrated in conjunction with methods, devices and systems which are meant to be exemplary and illustrative, not limiting in scope. In various embodiments, one or more of the above-described problems have been reduced or eliminated, while other embodiments are directed to other improvements.

Representative of the various embodiments is a method for implementation during a computer's boot sequence to load a selected operating system (OS) of interest. For purposes of such a method the computer includes a system BIOS, a video BIOS, and a customary boot loader which is accessible from a pre-determined address pointed to by a system interrupt pointer. The term "customary", whether used in context of a boot loader or an OS, is to be interpreted as broadly as possible to encompass that which is available to the computer system prior to incorporation of the teachings described herein. Thus, for instance, an original OS and boot loader from a manufacturer, or endorsed updates thereto, are deemed customary.

According to the representative method, during execution of the system BIOS, the system interrupt pointer is redirected to an alternate address from which a replacement boot loader is accessible. The selected OS of interest is then loaded via the replacement boot loader rather than the customary boot loader. Advantageously, by bypassing execution of the customary boot loader during system BIOS execution, one can help insulate the computer from being compromised by a boot virus implanted in the master boot record (MBR) by tradition contains the boot loader. This can go a long way towards resolving insecurity issues which arise from traditional booting sequences.

In addition to the above, further advantages, aspects and embodiments will become apparent by study of the following descriptions and by reference to the drawings:

BRIEF DESCRIPTION OF THE DRAWINGS

Exemplary embodiments are illustrated in the referenced figures of the drawings. It is intended that the embodiments and figures disclosed herein be considered illustrative rather than limiting. In the figures.

DETAILED DESCRIPTION

One purpose of the described aspects and embodiments is to avoid some of the legacy issues associated with traditional booting sequence procedures to enhance system security. From the description to follow, it will be appreciated that the various embodiments provide an advancement over traditional booting sequences to provide a user with more control over his/her computer system to help insulate it from potential compromise by foreign factors, such as a boot virus, whether implanted via insertion of bootable removable media or otherwise. Such advancement can also benefit original equipment manufacturers (OEMs) who may have a desire to create a networked computer (thin client) while still maintaining a user-controlled operating system (OS). In this regard, the thin client could be designed so that it will boot strap into a selected OS of interest, for example on every third restart, and download current updates which would be placed on the customary host OS. This would offer both protection and ensure the initial investment, while still catering to thin client owners. These represent only a few advantages which should be recognized by the ordinarily skilled artisan.

In the following detailed description, reference is made to the accompanying drawings which form a part hereof, and in which is shown by way of illustrations certain exemplary embodiments. The leading digit(s) of the reference numbers in the figures usually correlate to the figure number; one notable exception is that identical components which appear in multiple figures are identified by the same reference numbers. The embodiments illustrated by the figures are described in sufficient detail to enable those skilled in the art to practice the invention, and it is to be understood that other embodiments may be utilized and changes may be made without departing from the spirit and scope of the present invention. The following detailed description is, therefore, not to be taken in a limiting sense, and the scope of the present invention is defined by the appended claims.

Certain aspects discussed herein should have conventional meanings to those with a pertinent understanding of computer system architectures (e.g., input/output systems, peripheral cards), computer programming languages (e.g., high level languages and assembly language), and operating systems—particularly boot loaders for use in flourishing an OS. Individuals having one or more such qualifications are sometimes referred to interchangeably as "embedded hardware engineers" or "embedded systems engineers". While the description to follow may entail terminology which is perhaps tailored to certain computing or programming environments, the ordinarily skilled artisan will appreciate that such terminology is employed in a descriptive sense and not a limiting sense.

Figure 3:
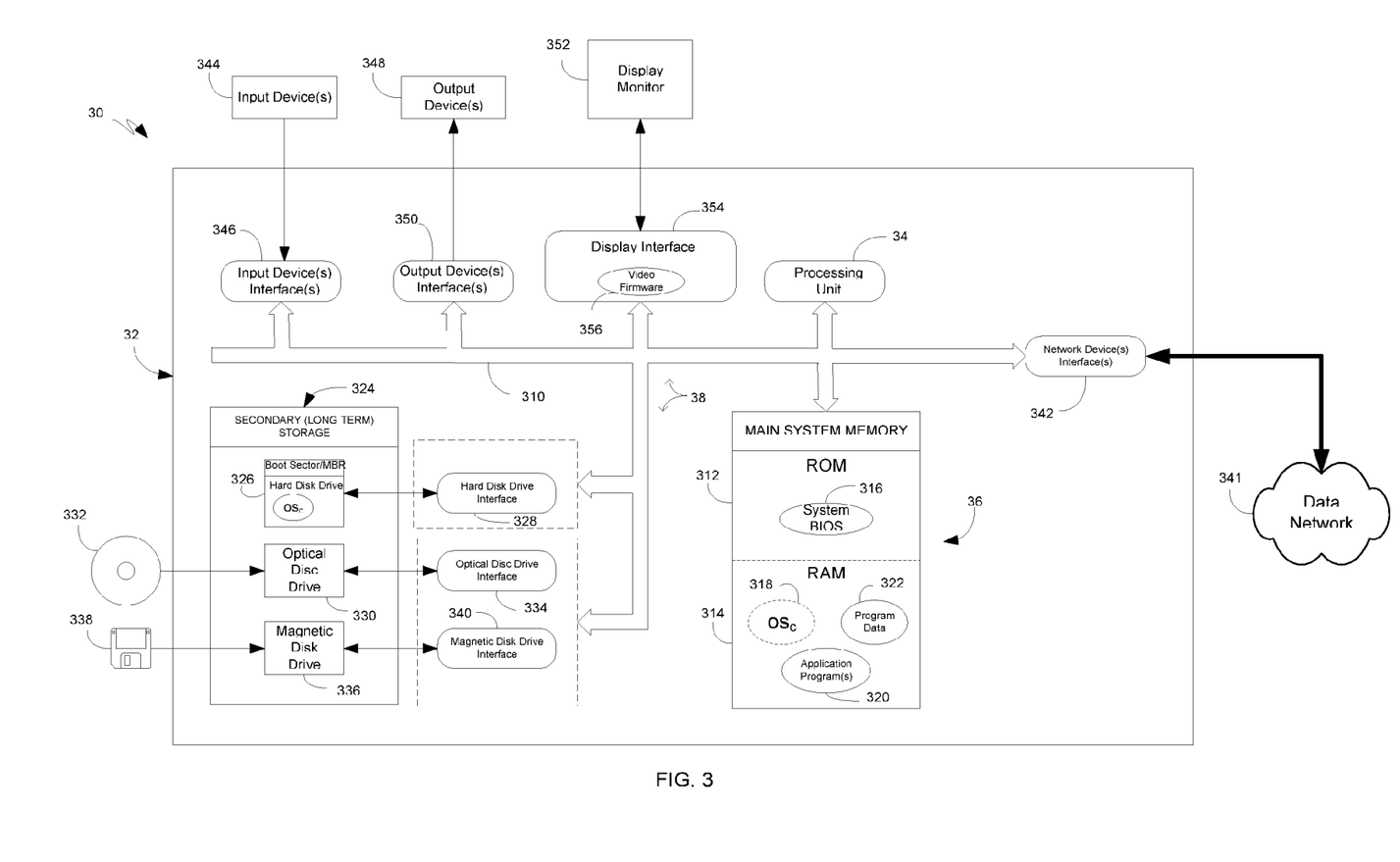
FIG. 3 illustrates a diagram of a representative computing environment for a computer system that may be configured to implement aspects of one or more described embodiments.

Before describing the invention in detail, embodiments of illustrative computing environments for use in implementing aspects of the invention will be described. FIG. 3 illustrates a representative computing environment 30 which is suited for implementing the various described embodiments. Computing environment 30 may utilize a general purpose computer system 32 for executing applications in accordance with the described teachings. System 34 includes a processing unit 34 (e.g., a CPU 162), a system memory 36 and an input output (I/O) system, generally 38. These various components are interconnected by system bus 310 which may be any of a variety of bus architectures. System memory 36 may include both non-volatile read only memory (ROM) 312 and volatile memory such as static or dynamic random access memory (RAM) 314. Programmable read only memories (PROMs), erasable programmable read only memories (EPROMs) or electrically erasable programmable read only memories (EEPROMs) may be provided. ROM portion 312 stores a basic input/output system (the system BIOS) as shown. RAM portion 314 stores a particular OS 318 for the system (e.g. its customary operating system ($OS_c$)), one or more application programs 320, and program data 322. Computer system 32 may be adapted to execute in any of the well-known operating system environments, such as Windows, UNIX, MAC-OS, OS2, PC-DOS, DOS, etc.

Various types of storage devices can be provided as more permanent data storage areas which can be either read from or written to, such as contemplated by secondary (long term storage) 324. Such devices may, for example, include a non-removable, non-volatile storage device in the form of a large-capacity hard disk drive 326 which is connected to the system bus 310 by a hard disk drive interface 328. Hard disk drive 326 includes at least one bootable disk which incorporates the boot sector (or MBR) and may also store the customary OS that is loaded into RAM during the booting sequence.

An optical disk drive 330 for use with a removable optical disk 332 such as a CD-ROM, DVD-ROM or other optical media, may also be provided and interfaced to system bus 310 by an associated optical disk drive interface 334. Computer system 32 may also have one or more magnetic disk drives 336 for receiving removable storage such as a floppy disk or other magnetic media 338 which itself is connected to system bus 310 via magnetic disk drive interface 340. Optical media such as 332 and magnetic media such as 338 represent removable, non-volatile storage devices. Remote storage over a network is also contemplated.

One or more of the memory or storage regions mentioned above may comprise suitable media for storing programming code, data structures, computer-readable instructions or other data types for the computer system 32. Such information is then executable by processor 34 so that the computer system 32 can be configured to embody the capabilities described herein. Alternatively, the software may be distributed over an appropriate communications interface so that it can be installed on the user's computer system.

System 32 may be adapted to communicate with a data distribution network 341 (e.g., LAN, WAN, the Internet, etc.) via communication link(s). Establishing the network communication is aided by one or more network device(s) interface(s) 342, such as a network interface card (NIC), a modem or the like which is suitably adapted for connection to the system bus 310. System 32 preferably also operates with various input and output devices as part of I/O system 38. For example, user commands or other input data may be provided by any of a variety of known types of input devices 344 (e.g. keyboard, pointing device, etc.) and associated input interface(s), generally 346. One or more output devices 348 (e.g. printer, fax, etc.) with associated interfaces, generally 350, may also be provided. A monitor 352 or other suitable display device is provided and may be connected to the system bus 310 by a suitable video adapter 354 (i.e., video card) having associated video firmware 356.

Although certain aspects for the computer system may be preferred in the illustrative embodiments, the present invention should not be unduly limited as to the type of computers on which it can be implemented, and it should be readily understood that the present invention indeed contemplates use in conjunction with any appropriate information processing device (IPD) having the capability of being configured in a manner for accommodating the invention. Moreover, it should be recognized that the invention could be adapted for use on computers other than general purpose computers, as well as on general purpose computers without conventional operating systems.

The exemplary embodiments are preferably implemented on an IPD having some type of display device with associated firmware, but not necessarily a video adapter which the firmware. Typically, a display device is the only peripheral device which requires associated firmware to boot. This is because, in order for a system BIOS to display anything on a screen, for example, it is necessary to load default values onto the video adapter (if present) and its associated display. Thus, since a video adapter's BIOS takes precedence (from a booting sequence standpoint) over any BIOS for other peripheral devices, this provides an attractive area for implementing the various aspects and embodiments which are described herein.

Figure 4A:
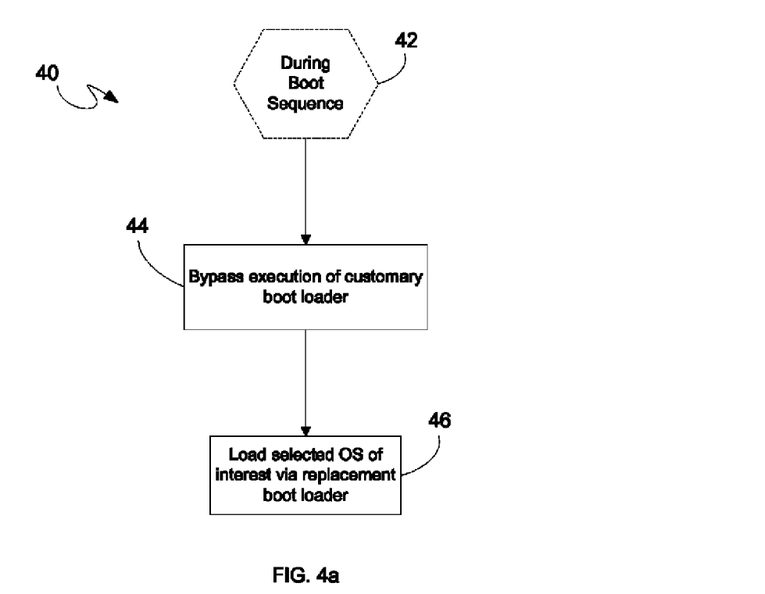
FIGS. 4a and 4b are high level flow diagrams for implementing exemplary embodiments of methods in accordance with the teachings herein.
Figure 4B:
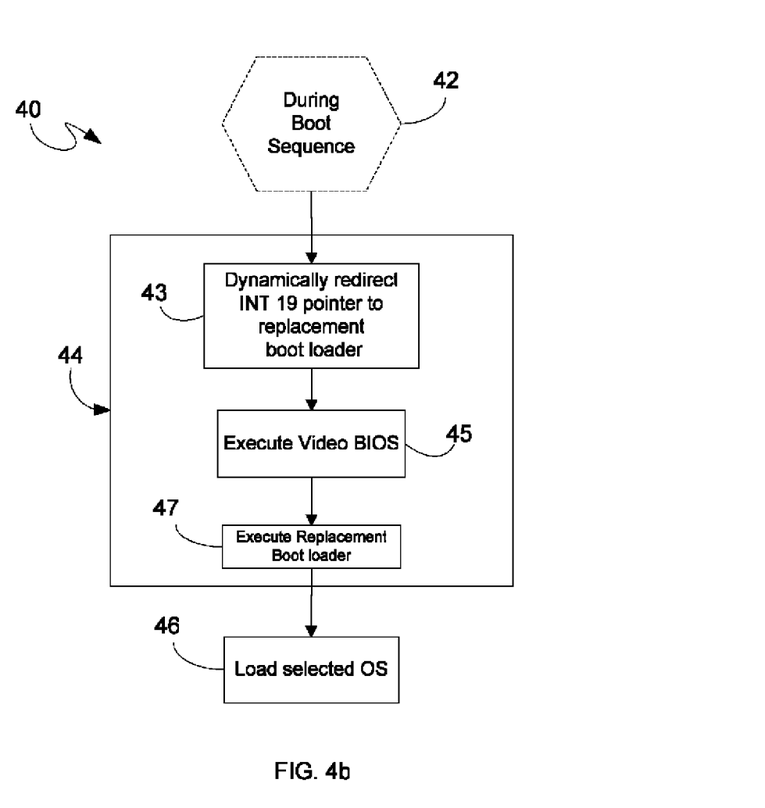
Figure 5:
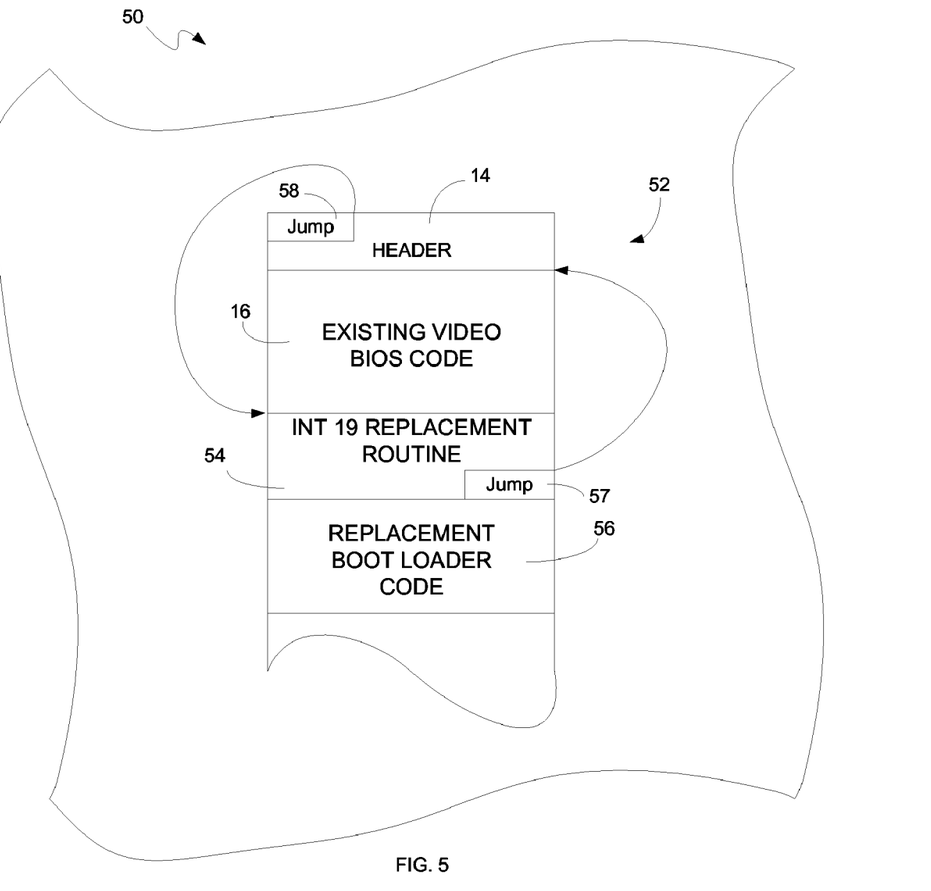
FIG. 5 diagrammatically depicts, in block form, a modified video card and its associated modified firmware according to the teachings herein.

At a high level of explanation, and with reference to FIGS. 4a & b, a method 40 is provided for implementation during a boot sequence 42 to bypass execution of a customary boot loader 44 for the purpose of loading a selected OS of interest via a replacement boot loader 46. Bypassing execution of the customary boot loader is accomplished, in part, by dynamically redirecting (during execution of system BIOS) the INT19 pointer within the system interrupt table to point to the replacement boot loader 43, followed by execution of the existing video BIOS at 45 and execution of the replacement boot loader at 47 to load the selected OS These aspects will be described in more detail now with reference to the remaining figures. In the preferred implementation, and with initial reference to FIG. 5, a video card 50 is provided with modified firmware 52 which, as before, has associated firmware code including a header 14 and the existing video BIOS code 16. The existing video BIOS code (i.e. video BIOS) can either be an original or updated version of the video BIOS provided by the manufacturer. In modified firmware 52, however, the initial jump instruction 58 is altered to initially bypass the existing video BIOS code 16 and instead implement a new routine 54 for replacing the INT19 pointer. More particularly, this routine 54 redirects the pointer from the master boot record (MBR) on the bootable hard disk to an alternate location containing a replacement boot loader, or an initial part thereof, from which the remaining part of the boot loader is accessible. As shown in FIG. 5, the replacement boot loader code 56 could reside entirely on the video firmware, although this is certainly not a requirement. That is, the initial part could reside on the video firmware with the remainder residing on the hard drive at a suitable location. Alternatively still, the entire boot loader could reside on the hard drive, with the video firmware containing a pointer to its location. These are only a few representative examples. Incorporated into the INT19 replacement routine 54 is a second jump instruction 57 to the existing video BIOS code 16 so that it can now be executed as normal.

As discussed above for those systems which are to specification, the INT19 pointer within the system interrupt table has a pre-determined address location at 0000:7C00 in memory where the bootable drives boot sector is copied. Thus, during a conventional boot sequence, system BIOS jumps to this location in memory when the INT19 command is issued so that the customary boot loader may be executed to flourish the OS. However, by replacing the pointer with an alternate address this can be bypassed. Those suitably skilled will understand how to code such an INT19 replacement routine so that no additional discussion is needed. The alternate address for the INT19 pointer is that from which the replacement boot loader is accessible. In FIG. 5, this would correspond to an address on the video firmware 52.

It can be appreciated then that a software/firmware upgrade process is contemplated which is unique, at least in that, it can intercede standard code execution during an anticipated boot procedure. When the video firmware is executed, the INT19 replacement routine hooks the standard interrupt for boot strapping and continues normal operation. Only when the system is prepared to boot does the hooked interrupt begin execution to enable a replacement boot loader, and thereafter, a full OS environment.

It is recognized that INT19 is the primary interface to the system BIOS, but is a standard having limitations that have become more evident in recent years. More particularly, the standard INT19 BIOS interface uses 24 bytes of addressing information and, as such, can only handle drives containing up to about 8 GB at 512 bites per sector. As a result, a new interface referred to as INT13h extensions has been developed to replace the existing interrupt. It is not only contemplated that the teachings herein can be used with such an interface which overcomes the 8 GB barrier, but any suitable interface or the like, whether now or hereafter developed, which directs system BIOS to a systems boot sector during a booting sequence.

Figure 6:
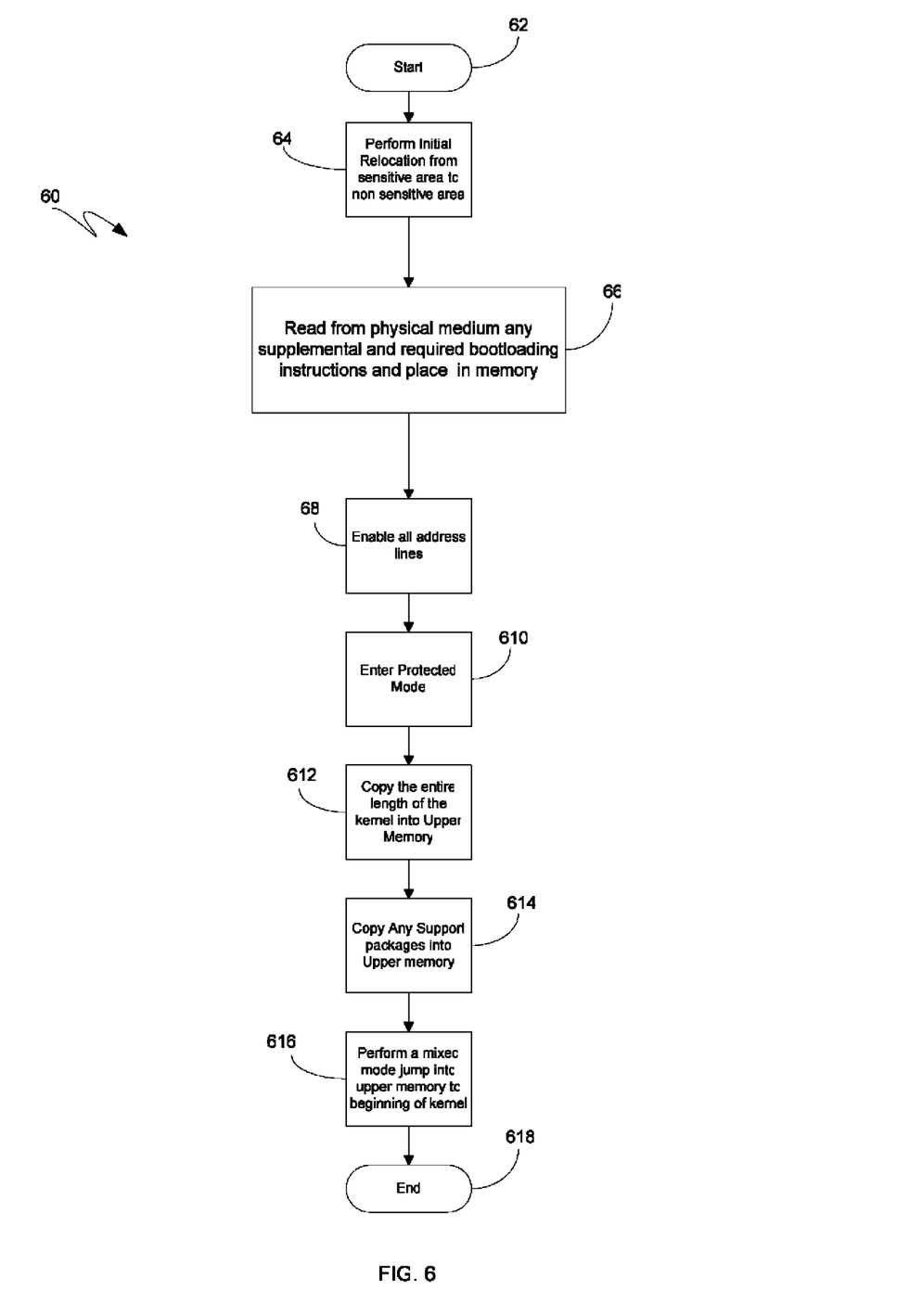
FIG. 6 depicts, in general terms, the flow of a typical boot loader.

The replacement boot loader can, in many respects, mirror the customary boot loader or be customized to one's preferences. Accordingly the particular aspects of the boot loader itself, as well as the selected OS of interest for that matter, are not particularly pertinent to appreciating the benefits of the exemplary embodiments. Notwithstanding, FIG. 6 depicts the flow 60 for a generalized boot loader. Following start 62 an initial relocation is performed at 64 from a sensitive area within memory to a non-sensitive area. Once in the non-sensitive memory area the physical medium is read 66 to determine any supplemental and required boot loading instructions from a known location so that they may placed in memory. All address lines are enabled 68 and protected mode is entered 160. The entire length of the kernel is copied into upper memory 162 as well as any support packages 164. A mixed mode jump is performed into the upper memory 166 where the kernel begins and boot loading ends at 168.

Figure 7A:
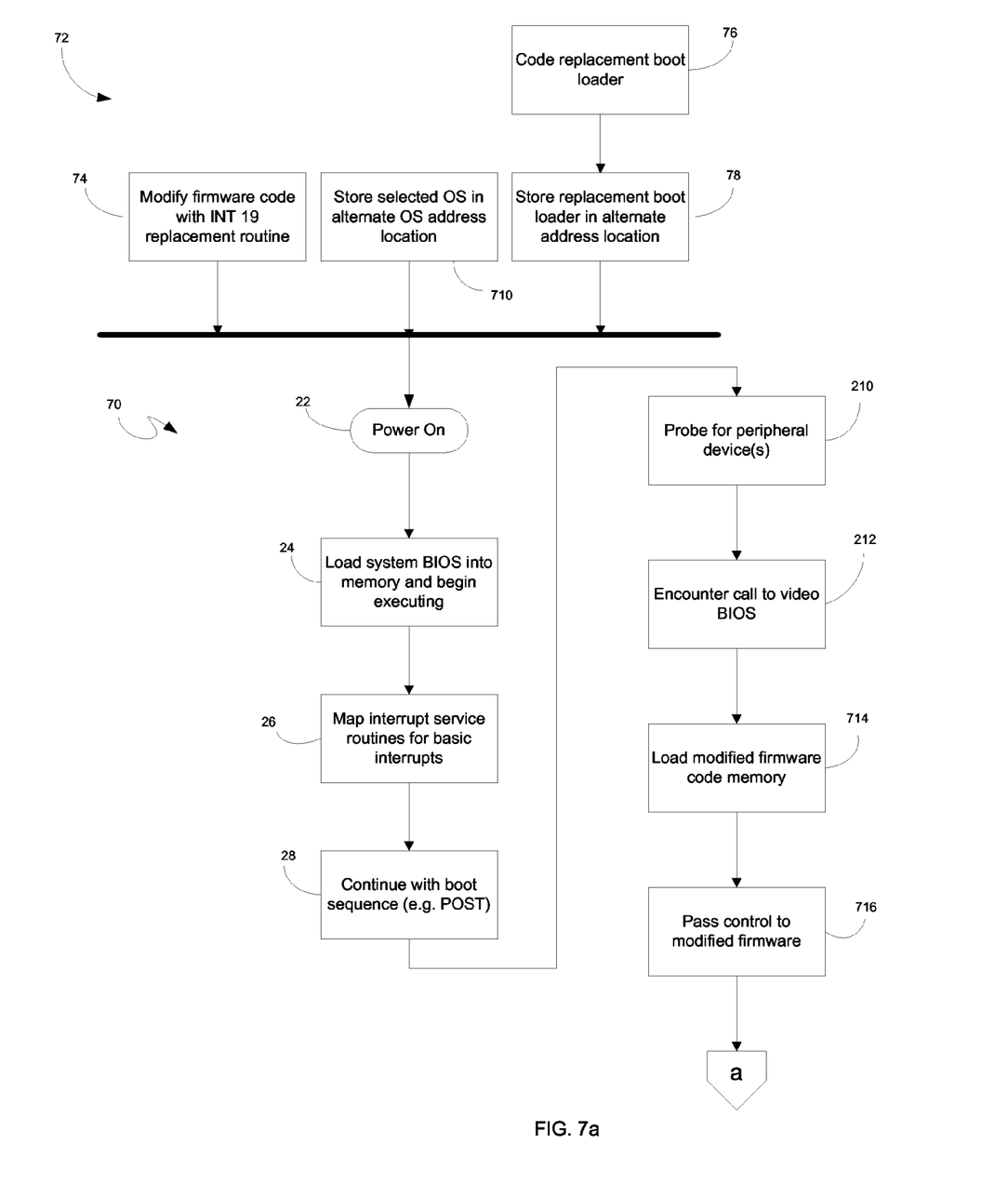
FIGS. 7a and 7b collectively comprise a modified booting sequence in accordance with the described embodiments.
Figure 7B:
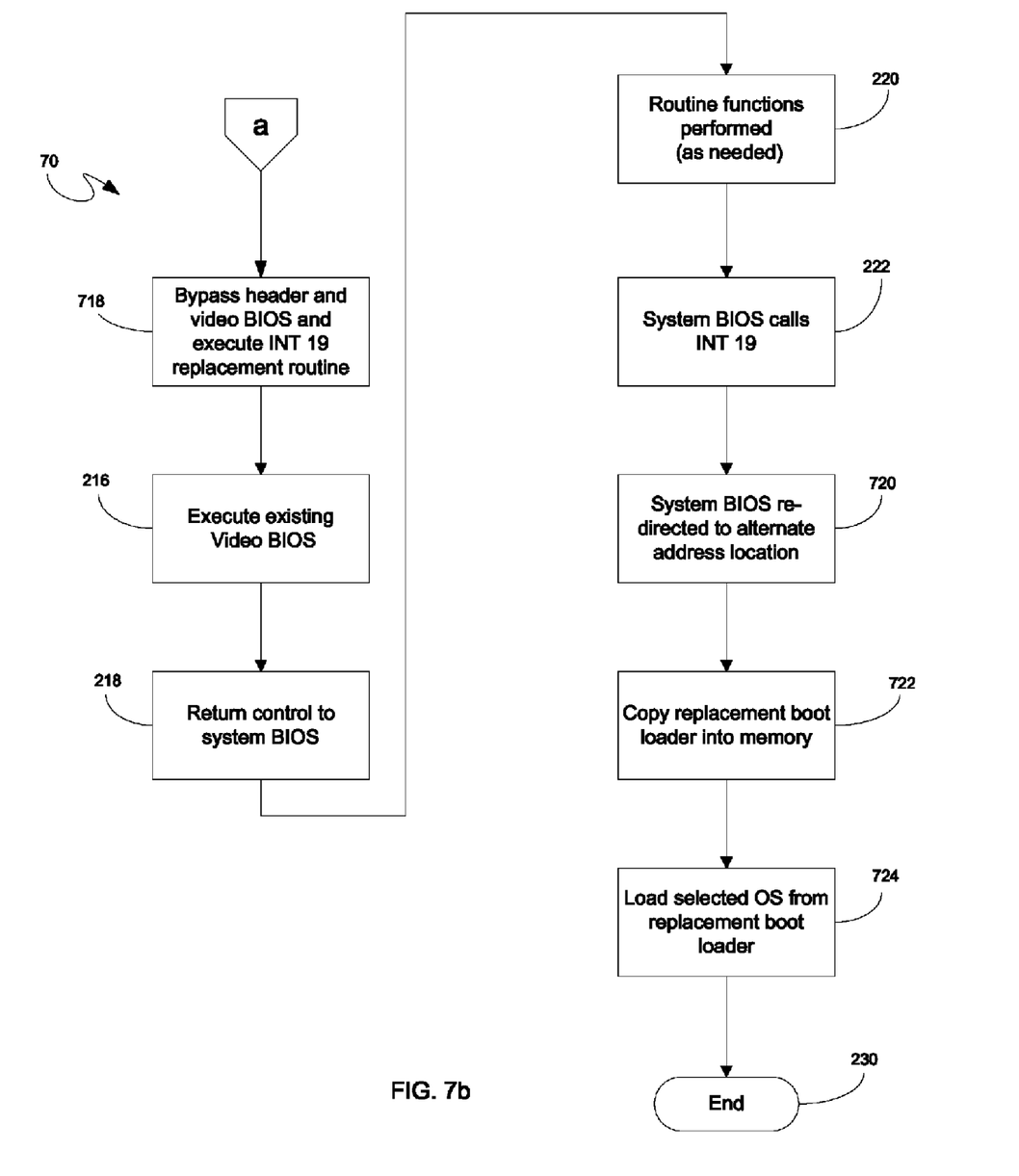
Figure 8:
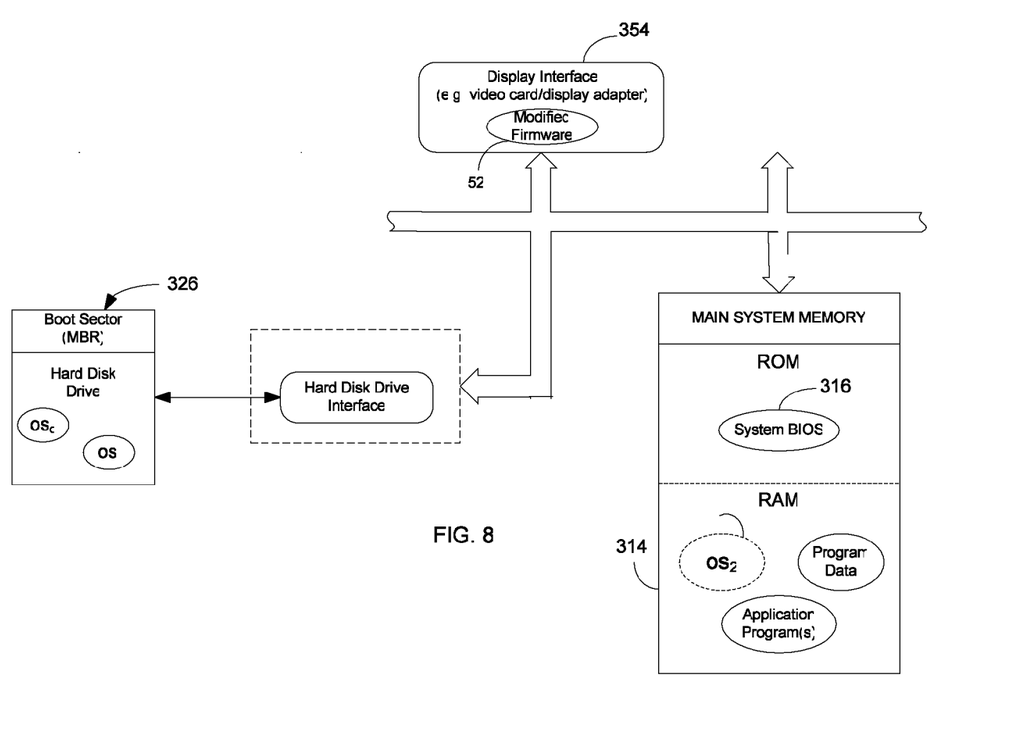
FIG. 8 shows a pertinent portions of a computing environment, such as that depicted in FIG. 3, so that aspects of the exemplary embodiments may be better appreciated.

Reference is now made to FIGS. 7a-b and 8 to better appreciate a modified booting sequence according to the invention, during which exemplary embodiments of methods may be implemented. It is to be appreciated that, since aspects of some of the embodiments are implemented during the traditional booting sequence as previously discussed with reference to FIG. 2, those corresponding operations in FIGS. 7a-b need not be repeated and are referred to by the same reference numbers. A similar understanding should be appreciated with reference to FIG. 8 as it relates to previously discussed FIG. 3.

With this in mind, FIG. 7a illustrates preliminary operations which take place prior to initiating the modified boot sequence 70. These preliminary operations, generally 72, need not occur in any particular sequence. At 74, the video card's firmware code is modified with the INT19 replacement routine discussed above with reference to FIG. 5. A suitable replacement boot loader is coded at 76 and may be stored 78 in an alternate address location(s) which, as mentioned above, may be on the firmware itself (FIG. 5) or elsewhere on the hard drive. In any event, a modified firmware 52 is generated for the video card 354 as represented in FIG. 8. Also, if desired, the selected OS of interest is stored 710 in an alternate address location. The artisan will recognize that benefits may be derived regardless whether the selected OS of interest is the same or different from the customary OS or whether (if the same) it is stored at the same or different location on the hard disk drive. For example, if one is interested in insulating against boot sector viruses without altering the OS which is loaded, then the customary OS can either be stored in its existing location or copied to an alternate location. For purposes of explaining a preferred embodiment, as illustrated in FIG. 8, two operating systems are present on the hard disk drive 326. The customary OS ("$OS_c$") resides at one location, while the selected operating system of interest ("$OS_i$") is stored at a different location on the hard disk 326 as depicted.

With continued reference to FIG. 7a, after system BIOS encounters the call to video BIOS at 212 it loads at 714 the modified firmware code into memory. When control is passed 716 to the modified firmware code the header is bypassed by virtue of the initial jump 58 (FIG. 5) to execute the INT19 replacement routine for redirecting the INT19 pointer. Existing video BIOS is executed 216 by virtue of second jump instruction 57 (FIG. 5). Thus, after control is returned to system BIOS at 218 and INT19 is called 222, system BIOS is redirected at 720 to the alternate address location containing the replacement boot loader code (e.g. 56 in FIG. 5). This alternate address location is preferably one which is unlikely to be written to by another program. As an example, the replacement bootloader code could be stored behind the normal partition of a hard drive in what is called the slack space, usually 8 mb on a Windows partition. The replacement boot loader code is copied to memory location 0000:7C00 per the conventional approach. Execution of the replacement boot loader causes the selected OS of interest ($OS_i$) to be copied into RAM 314 (FIG. 8) so that it may be loaded at 724. The selected OS of interest will then begin executing with any customized functions designed therein, and the booting sequence ends at 230. The aspects described herein have been implemented on the EEPROM (Electrically Erasable Programmable Read Only Memory) of an ATI Radeon 9200 video card, available from ATI Technologies, Inc.

A prototype has been constructed in which a boot loader and an OS have been implanted at two different locations on a hard disk drive. The prototype was suitable for implementation on the 8500 series up to the 9600 series of the ATI Radeon video cards. Supported operating systems were Microsoft Windows XP and Microsoft Windows 2000. The flashing sequence for the video BIOS was accomplished with a firmware modifier via hooks in the existing architecture for the video card, all as known in the art. The actual flashing program used was a modified version of WinFlash which is readily available. The flashing code was written in the C programming language utilizing Microsoft's Visual Studio environment, while the INT19 replacement code and the code to begin boot loading were written in assembly language.

It is believed that the various aspects and embodiments described above can be ported to a variety of different computing platforms. Further, the programming could be developed using several widely available programming languages with the software component(s) coded as subroutines, subsystems or objects depending on the language chosen. Thus, the described development tools utilized should not be interpreted to limit the environment of the present invention.

Moreover, one or more delivery modules for distribution on a wide variety of computer architectures could be constructed. Thus, software embodying the present invention may be distributed in known manners, such as on computer-readable media which containing the executable instructions for performing the methodologies discussed herein. Alternatively, the software may be distributed over an appropriate communications interface so that it can be installed on the user's computer system. Furthermore, alternate embodiments which implement the invention in hardware, firmware or a combination of both hardware and firmware, as well as distributing the modules and/or the data in a different fashion will be apparent to those skilled in the art.

With an understanding of the above description of the exemplary embodiments, the suitably skilled artisan will realize that a computer system configured accordingly would be unaffected by boot viruses. Moreover, vendors wishing to exhibit more control over their firmware could incorporate these features into their existing video cards. Indeed, the aspects could be incorporated onto the motherboard itself so that they would not be circumvented unless the motherboard were removed. Further, incorporating the above aspects into video firmware results in security through obscurity. For example, one could not simply override the capability of ensuring how the system is booting by simply infiltrating the system and flashing the video firmware with no code or different code. Unless the infiltrator has both knowledge that the modified booting sequences controlled by modified video firmware and its address organization, (i.e. the bounds of the existing code), then the potential infiltrator is faced with a real conundrum to actually patch the video firmware properly.

Accordingly, the present invention has been described with some degree of particularity directed to the exemplary embodiments of the present invention. While a number of exemplary aspects and embodiments have been discussed, those of skill in the art will recognize certain modifications, permutations, additions and sub-combinations thereof. It is therefore intended that the following appended claims and any claims hereafter introduced be interpreted to include all such modifications, permutations, additions and sub-combinations as are within their true spirit and scope.

What is claimed is:

1. A method for use with a computer to load a selected operating system (OS) of interest, comprising:
 a. providing firmware storing firmware code for a video adapter that is associated with the computer, said firmware code including:
  (i) video BIOS;
  (ii) replacement code associated with the video BIOS for redirecting a selected computer system interrupt pointer from a predetermined memory address from which a customary boot loader is accessible, to an alternate address from which a replacement boot loader is accessible, wherein the selected computer system interrupt pointer is associated with an INT 19 entry within a system interrupt table of the computer; and
 b. during execution of the computer's system BIOS:
  (i) loading said firmware code into the computer's system memory;
  (ii) passing control to said firmware code;
  (iii) executing said replacement code;
  (iv) executing said video BIOS;
  (v) returning control to the system BIOS for continued execution thereof;
  (vi) upon encountering a call within the system BIOS to the selected computer system interrupt pointer: loading the replacement boot loader into system memory; and
 executing the replacement boot loader for purpose of loading the selected OS.

2. The method according to claim 1 wherein said firmware code includes the replacement boot loader.

3. The method according to claim 1 wherein said firmware includes a header, and wherein said firmware code includes a jump instruction with said header for initially passing control to said replacement code.

4. The method according to claim 1 wherein said video BIOS is either an original video BIOS for the video adapter or an updated version thereof.

5. The method according to claim 4 wherein only said video BIOS is initially stored on said firmware.

6. The method according to claim 1 wherein all of said firmware code is initially stored on said firmware.

7. The method according to claim 1 wherein the pre-determined address is a beginning of the computer's master boot record (MBR).

8. The method according to claim 1 wherein said alternate address resides on said firmware.

9. A method for implementation during a computer's boot sequence to load a selected operating system (OS) of interest, said computer including a system BIOS, replacement code associated with a video BIOS, and a customary boot loader which is accessible from a pre-determined address pointed to by a system interrupt pointer, wherein the system interrupt pointer is associated with an INT 19 entry within a system interrupt table of the computer, said method comprising, during execution of the system BIOS:
 a. redirecting, by the replacement code, the system interrupt pointer to an alternate address from which a replacement boot loader is accessible; and
 b. loading the selected OS via the replacement boot loader rather than the customary boot loader.

10. The method according to claim 9 wherein said video BIOS and the replacement boot loader are stored on common firmware.

11. The method according to claim 10 wherein said alternate address resides on the common firmware.

12. A method for use with an information processing device (IPD) to load a selected operating system (OS) of interest, said IPD including a system BIOS, a display having display BIOS with an associated replacement code, and a customary boot loader accessible from a pre-determined address that is pointed to by a system interrupt pointer of the IPD, wherein the system interrupt pointer is associated with an INT 19 entry within a system interrupt table of the IPD, said method comprising, during execution of the system BIOS:
   a. redirecting, by the replacement code, the system interrupt pointer to an alternate address from which a replacement boot loader is accessible; and
   b. loading the selected OS via the replacement boot loader instead of the customary boot loader.

13. A method of insulating a computer's customary operating system (OS) from being compromised by a boot virus during a boot sequence, the computer including a system BIOS, replacement code associated with a video BIOS, and a master boot record (MBR) which stores at least part of a customary boot loader responsible for use in loading the customary OS, wherein the customary boot loader is accessible from a pre-determined address that is pointed to by a system interrupt pointer that is associated with an INT 19 entry within a system interrupt table, said method comprising:
   bypassing execution of the customary boot loader during execution of the system BIOS to avoid loading the customary OS, and instead executing a replacement boot loader pointed to by the replacement code associated with the video BIOS for purpose of loading a selected OS of interest.

14. The method according to claim 13 wherein the selected OS is different that the customary OS.

15. The method according to claim 13 wherein the selected OS is the customary OS.

16. A video adapter of a computer having firmware which includes a header and stored firmware code corresponding to a display BIOS, the video adapter comprising supplemental firmware code stored on the firmware for use in loading a selected operating system (OS) of interest for the computer, said supplemental firmware code including:
   a. replacement code for redirecting a selected system interrupt pointer within the computer's system interrupt table from a pre-determined address, wherein the selected computer system interrupt pointer is associated with an INT 19 entry within a system interrupt table of the computer, from which a customary boot loader is accessible, to an alternate address in the firmware; and
   b. a replacement boot loader accessible from the alternate address for loading the selected OS of interest.

17. The video adapter of claim 16 wherein said firmware code includes a first jump instruction within said header for initially passing control to said replacement code.

18. The video adapter of claim 16 including a second jump instruction for passing control from said replacement code to the display BIOS.

19. A video adapter comprising memory that stores primary firmware having a header and stored display BIOS code for configuring a computer's display device, and supplemental firmware code for loading a selected operating system (OS) of interest into the computer's system memory via a boot loader, said supplemental firmware code comprising:
   a. first executable code for redirecting a pointer associated with a system interrupt (INT) entry of the computer's system interrupt table, from a pre-determined address from which customary boot loader is accessible, to an alternate address located on said firmware from which a replacement boot loader is accessible, wherein the system interrupt pointer is associated with an INT 19 entry in the system interrupt table; and
   b. second executable code corresponding to at least a portion of a replacement boot loader.

20. The improvement of claim 19 wherein said supplemental firmware code includes a first jump instruction within said header for initially passing control to said first executable code.

21. The improvement of claim 19 including a second jump instruction for passing control from said first executable code to the display BIOS.

22. A computer-readable-media storing executable code for performing a method during execution a computer's system BIOS, wherein the computer includes a customary operating system (OS), a system interrupt table with an interrupt (INT) 19 pointer to a master boot record (MBR) of the computer, a customary boot loader accessible from the MBR which is responsible for loading the customary OS, and a video adapter having firmware which stores display BIOS with an associated replacement code, said method comprising:
   a. redirecting, by the replacement code, the INT 19 pointer from the MBR to an alternate address from which a replacement boot loader may be accessed;
   b. executing the display BIOS to configure the video adapter; and
   c. executing said replacement boot loader for purpose of loading a selected OS of interest which is different than the customary OS.

23. The computer-readable media according to claim 22 wherein said alternate address is located in the firmware.

24. The computer-readable readable media according to claim 22 wherein said replacement boot loader is stored on the firmware.

25. A computer system, comprising:
   non-volatile memory storing a customary operating system (OS), a customary boot loader responsible for loading the customary OS, and an alternate OS of interest;
   volatile system memory;
   a system board including a central processing unit (CPU) and system firmware which stores a system BIOS and a system interrupt table with an interrupt (INT) 19 pointer to a master boot record of the computer system;
   a system bus;
   a display device; and
   a video adapter interfaced to said CPU via said system bus, said video adapter including display firmware storing associated firmware code which includes:
      (i) display BIOS for controlling said display device; and
      (ii) executable code for enabling the alternate OS of interest to be loaded when control is passed to the display firmware by redirecting the INT 19 pointer from the master boot record during execution of the system BIOS.

26. A computer system, comprising:
   first executable storage means for storing a customary operating system (OS), a customary boot loader responsible for loading the customary OS, and an alternate OS of interest;
   volatile system memory;
   a system board including a central processing unit (CPU) and system firmware which stores a system BIOS and a system interrupt table with an interrupt (INT) 19 pointer to a master boat record of the computer system;
   a system bus;
   a display device; and
   a video adapter interfaced to said CPU via said system bus, said video adapter including second executable storage means for controlling said display device and enabling the alternate OS to be loaded when control is passed to the second executable storage means by redirecting the INT 19 pointer from the master boot record during execution of the system BIOS.

* * * * *